US012794309B2

(12) United States Patent
Ito

(10) Patent No.: US 12,794,309 B2
(45) Date of Patent: Nov. 10, 2026

(54) VEHICLE DRIVE DEVICE

(71) Applicant: AISIN CORPORATION, Kariya (JP)

(72) Inventor: Morio Ito, Kariya (JP)

(73) Assignee: AISIN CORPORATION, Kariya (JP)

( * ) Notice: Subject to any disclaimer, the term of this patent is extended or adjusted under 35 U.S.C. 154(b) by 154 days.

(21) Appl. No.: 18/266,028

(22) PCT Filed: Mar. 8, 2022

(86) PCT No.: PCT/JP2022/009958
§ 371 (c)(1),
(2) Date: Jun. 8, 2023

(87) PCT Pub. No.: WO2022/209623
PCT Pub. Date: Oct. 6, 2022

(65) Prior Publication Data

US 2024/0039362 A1 Feb. 1, 2024

(30) Foreign Application Priority Data

Mar. 31, 2021 (JP) ................................. 2021-061414

(51) Int. Cl.
*H02K 5/22* (2006.01)
*B60K 6/40* (2007.10)
(Continued)

(52) U.S. Cl.
CPC ................. *H02K 5/22* (2013.01); *H02K 5/24* (2013.01); *H02K 7/006* (2013.01); *H02K 11/33* (2016.01)

(58) Field of Classification Search
CPC . H02K 5/22; H02K 5/24; H02K 11/33; H02K 7/006; H02K 5/00; B60K 2001/001;
(Continued)

(56) References Cited

U.S. PATENT DOCUMENTS 7,207,187 B2 * 4/2007 Funahashi ........... F04C 29/0085 62/505
8,152,487 B2 * 4/2012 Watanabe ............... F04B 35/04 417/363
(Continued)

FOREIGN PATENT DOCUMENTS

CN 105163969 A 12/2015
JP 2004-316782 A 11/2004
(Continued)

OTHER PUBLICATIONS

May 24, 2022 International Search Report issued in International Patent Application No. PCT/JP2022/009958.
(Continued)

*Primary Examiner* — Burton S Mullins
(74) *Attorney, Agent, or Firm* — Oliff PLC

(57) ABSTRACT

A vehicle drive device includes a rotary electric machine, an inverter device, and a case. The case includes a case body and a cover member. The case body is integrally formed so as to form a first housing chamber that houses the rotary electric machine and a second housing chamber that houses the inverter device, and has an opening that is open from the second housing chamber toward an outside of the case. The cover member is disposed so as to cover the opening, and includes a flat plate portion. A sheet-shaped damping member having a function of converting vibration into heat is attached so as to cover at least a part of the flat plate portion.

7 Claims, 8 Drawing Sheets

(51) Int. Cl.

| | |
|---|---|
| ***H02K 5/24*** | (2006.01) |
| ***H02K 7/00*** | (2006.01) |
| ***H02K 11/33*** | (2016.01) |

(58) Field of Classification Search

CPC ........... B60K 6/40; B60K 6/405; B60L 53/20; H02M 7/003

USPC ................................................. 180/65.1, 291

See application file for complete search history.

(56) References Cited

U.S. PATENT DOCUMENTS

| | | | | |
|---|---|---|---|---|
| 8,813,896 | B2 * | 8/2014 | Littlefield | B60L 15/007 903/952 |
| 9,394,004 | B2 * | 7/2016 | Gotou | B60K 1/00 |
| 9,722,474 | B2 * | 8/2017 | Hattori | H02K 11/33 |
| 9,837,876 | B2 * | 12/2017 | Ishimaru | H02K 11/215 |
| 10,182,506 | B2 * | 1/2019 | Yogo | H05K 5/062 |
| 10,259,310 | B2 * | 4/2019 | Agata | H02K 5/20 |
| 11,116,097 | B2 * | 9/2021 | Wang | B32B 5/18 |
| 12,049,147 | B2 * | 7/2024 | Sato | B60K 6/40 |
| 2006/0040096 | A1 * | 2/2006 | Eadara | B32B 27/205 428/212 |
| 2010/0074772 | A1 * | 3/2010 | Hoshino | F04B 35/04 417/410.1 |
| 2016/0039276 | A1 | 2/2016 | Takahashi et al. | |
| 2016/0065038 | A1 | 3/2016 | Lee et al. | |
| 2019/0248222 | A1 | 8/2019 | Honjo et al. | |
| 2020/0083778 | A1 * | 3/2020 | Pack | H02K 5/06 |
| 2020/0127527 | A1 * | 4/2020 | Nakamatsu | H02K 7/116 |
| 2020/0266680 | A1 * | 8/2020 | Fujimoto | H02K 5/225 |
| 2021/0037665 | A1 * | 2/2021 | Wang | B32B 15/20 |
| 2021/0167667 | A1 * | 6/2021 | Ishikawa | H02K 5/203 |

FOREIGN PATENT DOCUMENTS

| | | | | | |
|---|---|---|---|---|---|
| JP | 2005110328 | A | * | 4/2005 | H02M 7/48 |
| JP | 2008-254555 | A | | 10/2008 | |
| JP | 2009106046 | A | * | 5/2009 | H02M 7/48 |
| JP | 2013-064343 | A | | 4/2013 | |
| JP | 2015-047050 | A | | 3/2015 | |
| JP | 2015182505 | A | * | 10/2015 | Y02T 10/72 |
| JP | 2017-229174 | A | | 12/2017 | |
| JP | 2019-140803 | A | | 8/2019 | |
| JP | 2020-169572 | A | | 10/2020 | |
| WO | 2016/006361 | A1 | | 1/2016 | |
| WO | WO-2021140712 | A1 | * | 7/2021 | B60K 1/00 |

OTHER PUBLICATIONS

Jun. 5, 2024 Extended Search Report issued in European Patent Application No. 22779847.7.

* cited by examiner

VEHICLE DRIVE DEVICE

TECHNICAL FIELD

The present disclosure relates to a vehicle drive device including a rotary electric machine, an inverter device for controlling drive of the rotary electric ma chine, and a case.

BACKGROUND ART

Japanese Unexamined Patent Application Publication No. 2019-140803 (JP 2019-140803 A) discloses a vehicle drive device (rotary electric machine unit) including a rotary electric machine, an inverter device (power control device) that controls the rotary electric machine, and a case that houses the rotary electric machine. The inverter device is mounted on the upper surface of the case. A noise absorbing member is provided between the upper surface of the case and the bottom surface of the inverter device.

RELATED ART DOCUMENTS

Patent Documents

Patent Document 1: Japanese Unexamined Patent Application Publication No. 2019-140803 (JP 2019-140803 A)

SUMMARY OF THE DISCLOSURE

Problem to be Solved by the Disclosure

When the unit (entire vehicle drive device) is structured by separately providing the case and the inverter device as described above, it is easy to obtain a structure in which vibration of a drive device such as the rotary electric machine is less likely to be transmitted to the inverter device. To achieve, for example, improvement in ease of mounting on a vehicle, cost reduction, and spatial resonance, however, the inverter device and the drive device (such as the rotary electric machine) may be integrated (the inverter device and the drive device may be housed in the same case). In such a case, the vibration on the drive device side is likely to propagate to a cover member of a housing space where the inverter device is housed. That is, vibration of the rotary electric machine, vibration of a gear mechanism, or the like may be transmitted through the wall of the case to cause vibration of the cover member.

In view of the above background, there is a demand to provide a technology for reducing the vibration of the cover member that closes the housing space where the inverter device is housed in the vehicle drive device including the rotary electric machine, the inverter device, and the integrally formed case that houses them.

Means for Solving the Problem

In view of the above, a vehicle drive device includes a rotary electric machine, an inverter device configured to control drive of the rotary electric machine, and a case. The case includes a case body and a cover member joined to the case body. The case body is integrally formed so as to form a first housing chamber that houses the rotary electric machine and a second housing chamber that houses the inverter device, and has an opening that is open from the second housing chamber toward an outside of the case. The cover member is disposed so as to cover the opening, and includes a flat plate portion. A sheet-shaped damping member having a function of converting vibration into heat is attached so as to cover at least a part of the flat plate portion.

The rotary electric machine and the inverter device for driving the rotary electric machine may be housed in the case including the integrally formed case body to facilitate mounting of the vehicle drive device on a vehicle. When the inverter device and the rotary electric machine are housed in the case integrally formed in this manner, the vibration of the rotary electric machine is likely to be transmitted to the second housing chamber that houses the inverter device. The second housing chamber has the opening through which, for example, the inverter device is attached to the case. The opening is often covered with the cover member. When the cover member is thinned to reduce the size of the vehicle drive device, the cover member often has the flat plate portion. With the flat plate portion, when the vibration of the rotary electric machine is transmitted to the cover member, the flat plate portion particularly vibrates and is likely to cause noise or the like. According to this configuration, the damping member is attached so as to cover at least a part of the flat plate portion. Therefore, the vibration transmitted from the cover member can be converted into heat by the damping member, and the vibration of the cover member can be reduced. That is, according to this configuration, it is possible to reduce the vibration of the cover member that closes the housing space where the inverter device is housed in the vehicle drive device including the rotary electric machine, the inverter device, and the integrally formed case that houses them.

Further features and advantages of the vehicle drive device will become apparent from the following description of an exemplary and non-limiting embodiment that will be given with reference to the drawings

MODES FOR CARRYING OUT THE DISCLOSURE

Figure 1:
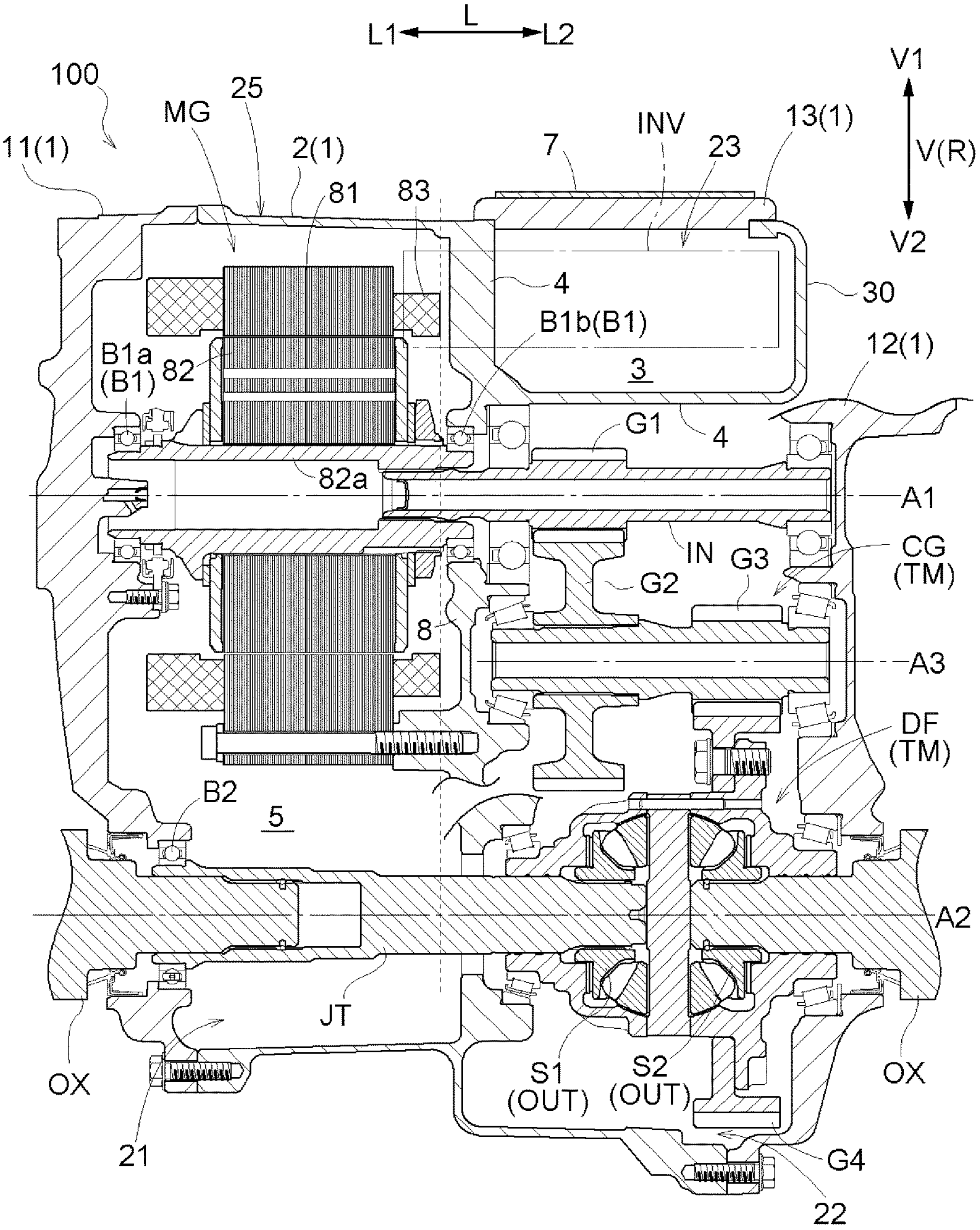
FIG. 1 is an axial sectional view of a vehicle drive device.

Hereinafter, an embodiment of the present disclosure will be described with reference to the drawings. As shown in an axial sectional view of FIG. 1, an axially orthogonal sectional view of FIG. 2, a plan view of FIG. 3, a skeleton diagram of FIG. 4, a circuit block diagram of FIG. 5, and the like, a vehicle drive device 100 includes a rotary electric machine MG, an inverter device INV that controls drive of the rotary electric machine MG, and a case 1. The case 1 includes a case body 2 and a cover member (first cover 11, second cover 12, and third cover 13) joined to the case body 2. The case body 2 is integrally formed so as to form a first housing chamber 5 that houses at least the rotary electric machine MG and a second housing chamber 3 that houses the inverter device INV. As used herein, the expression "integrally formed" refers to a single-piece member made of the same material and formed as, for example, a single die casting. The case body 2 includes a partition wall portion 4 that separates the first housing chamber 5 and the second housing chamber 3 from each other. That is, the case 1 is integrally formed so as to include the first housing chamber 5 that houses at least the rotary electric machine MG and the second housing chamber 3 that houses the inverter device INV and is separated from the first housing chamber 5 by the partition wall portion 4.

The vehicle drive device 100 includes the rotary electric machine MG disposed on a first axis A1, a pair of output members OUT disposed on a second axis A2 and drivingly connected to a pair of wheels W, a transmission mechanism TM that transmits a driving force between the rotary electric machine MG and the output members OUT, and the inverter device INV that controls the drive of the rotary electric machine MG. The rotary electric machine MG is a driving force source for the pair of wheels W. The transmission mechanism TM includes a counter gear mechanism CG and a differential gear mechanism DF (output differential gear device). The differential gear mechanism DF distributes the driving force transmitted from the rotary electric machine MG to the pair of wheels W. Although details will be described later, a pair of side gears (first side gear S1 and second side gear S2) of the differential gear mechanism DF corresponds to the pair of output members OUT. In the present embodiment, in the vehicle drive device 100, the counter gear mechanism CG and the differential gear mechanism DF are provided as the transmission mechanism TM (power transmission device) in this order from the rotary electric machine MG side in a power transmission path connecting the rotary electric machine MG serving as a power generation device and the wheels W.

The axis of the rotary electric machine MG (first axis A1) and the axis of the differential gear mechanism DF (second axis A2) are axes different from and parallel to each other. The axis of the counter gear mechanism CG (third axis A3) is parallel to the first axis A1 and the second axis A2. That is, the first axis A1, the second axis A2, and the third axis A3 are imaginary axes different from each other, and are parallel to each other.

In the following description, a direction parallel to the axes (A1 to A3) will be referred to as "axial direction L" of the vehicle drive device 100. One side in the axial direction L (in the present embodiment, a side where the rotary electric machine MG is disposed with respect to the differential gear mechanism DF) will be referred to as "first axial side L1", and the opposite side will be referred to as "second axial side L2". A direction orthogonal to each of the first axis A1, the second axis A2, and the third axis A3 will be referred to as "radial direction R" with respect to each axis. When it is not necessary to distinguish the axis to be used as a reference, or when the axis to be used as a reference is clear, the direction may be simply referred to as "radial direction R". A direction along the vertical direction when the vehicle drive device 100 is attached to the vehicle will be referred to as "up-down direction V". In the present embodiment, a first up-down side V1 that is one side in the up-down direction V is an upper side, and a second up-down side V2 that is the other side in the up-down direction V is a lower side. When the vehicle drive device 100 is attached to the vehicle in parallel to a horizontal plane, one direction of the radial direction R agrees with the up-down direction V. A direction orthogonal to the axial direction L and the up-down direction V will be referred to as "width direction H (front-rear direction)". One side in the width direction H will be referred to as "first widthwise side H1", and the other side in the width direction H will be referred to as "second widthwise side H2". As with the up-down direction V, one direction of the radial direction R also agrees with the width direction H. In the following description, terms related to the direction, the position, and the like of each member represent concepts that include a state in which there is a difference due to an error permissible in manufacturing. The direction of each member represents a direction of the member when mounted on the vehicle drive device 100.

The first housing chamber 5 formed in the case 1 includes a peripheral wall portion 25 formed so as to surround the rotary electric machine MG, the counter gear mechanism CG, and the differential gear mechanism DF. The first housing chamber 5 in the case 1 is surrounded by the peripheral wall portion 25 in the up-down direction V and the width direction H, and is open on both sides in the axial direction L. The opening of the first housing chamber 5 on the first axial side L1 will be referred to as "first opening 21", and the opening of the first housing chamber 5 on the second axial side L2 will be referred to as "second opening 22". The first opening 21 is closed by the first cover 11 joined to the end of the peripheral wall portion 25 on the first axial side L1. The second opening 22 is closed by the second cover 12 joined to the end of the peripheral wall portion 25 on the second axial side L2. That is, the first housing chamber 5 is formed as a space surrounded by the peripheral wall portion 25, the first cover 11, and the second cover 12.

Figure 2:
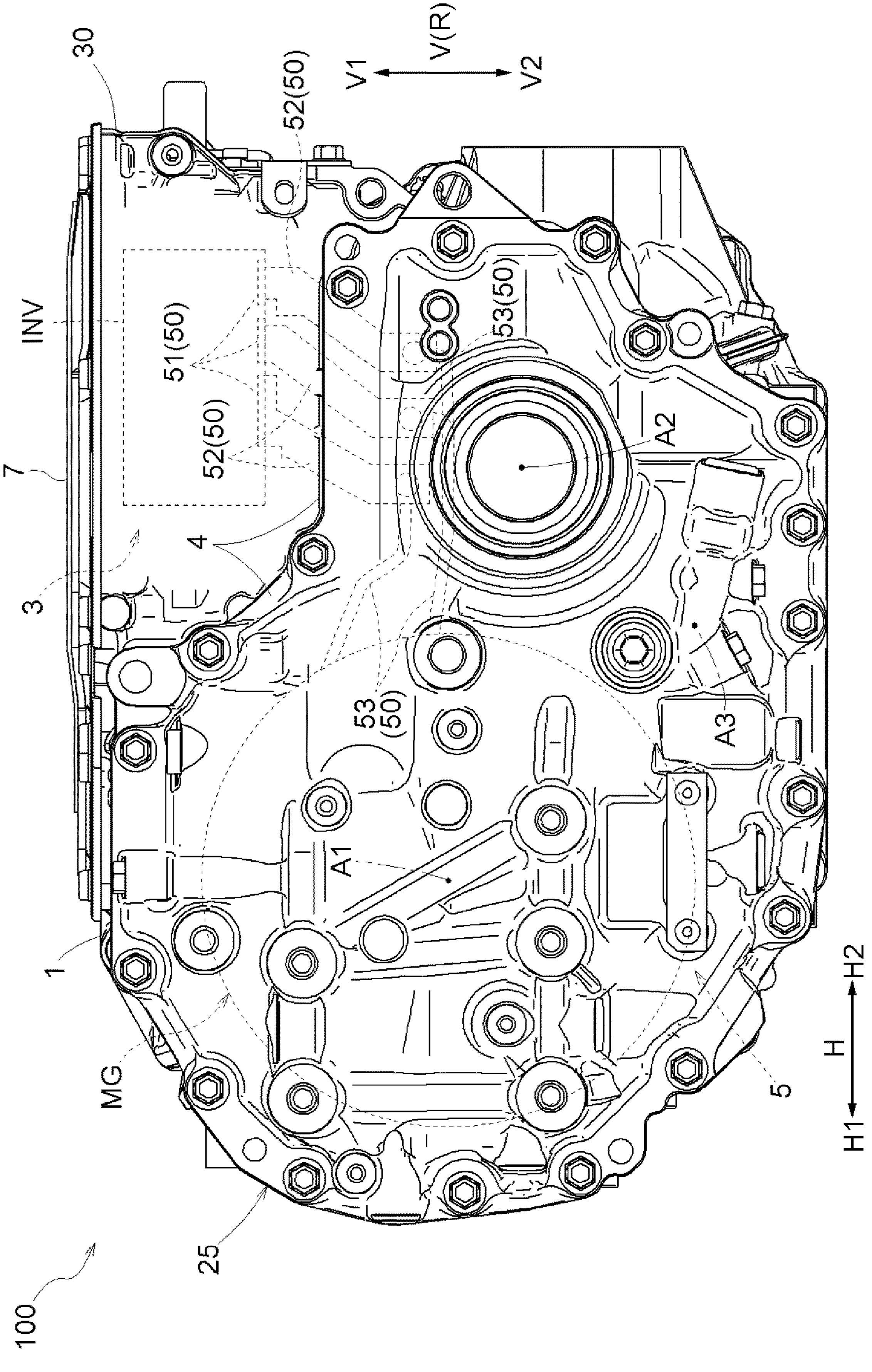
FIG. 2 is an axially orthogonal sectional view of the vehicle drive device.
Figure 3:
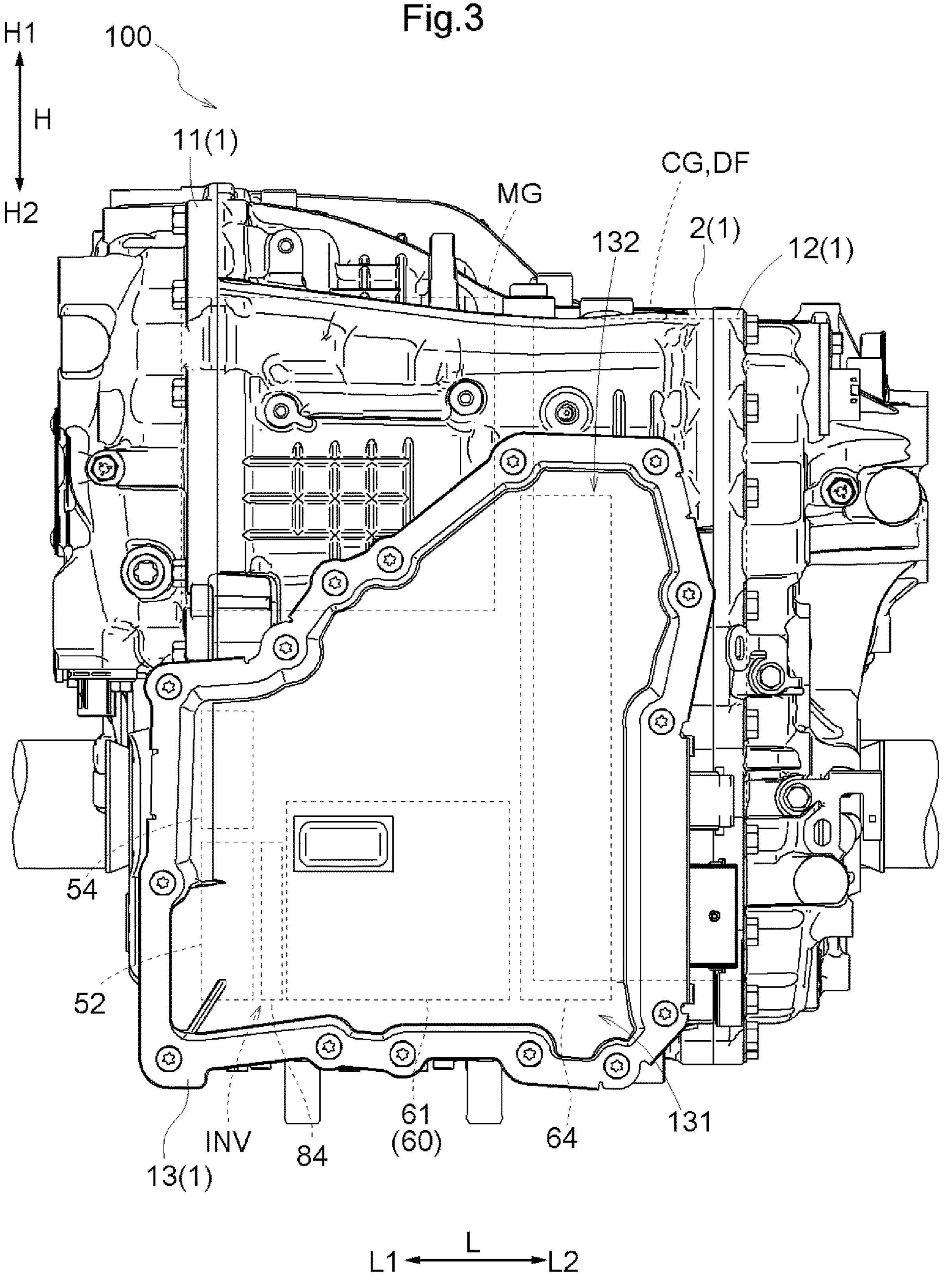
FIG. 3 is a plan view of the vehicle drive device from a first up-down side.
Figure 4:
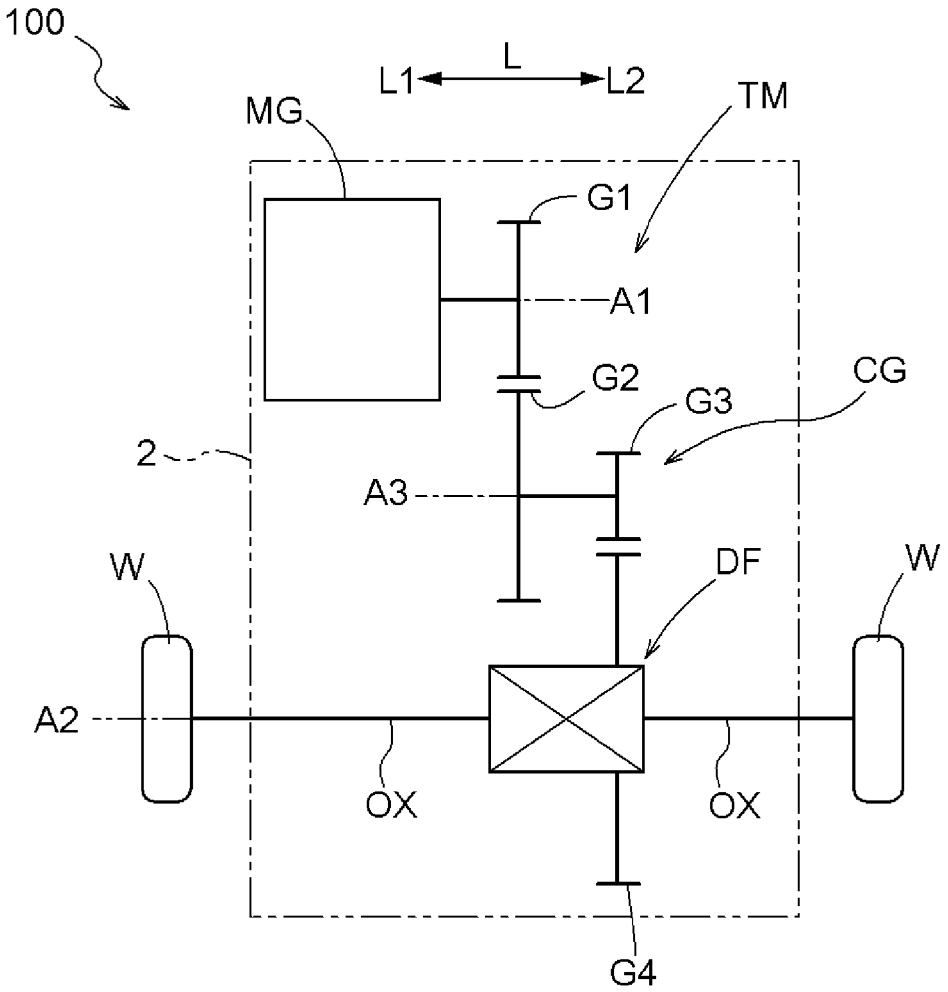
FIG. 4 is a skeleton diagram of the vehicle drive device.

A part of the peripheral wall portion 25 functions as the partition wall portion 4 that separates the first housing chamber 5 and the second housing chamber 3 from each other. A housing wall 30 extending along the up-down direction V is formed from the peripheral wall portion 25. The end of the housing wall 30 is open, and an opening (third opening 23) that is open from the second housing chamber 3 toward the outside of the case 1 is formed. The third opening 23 is closed by the third cover 13 joined to the end of the housing wall 30. That is, the second housing chamber 3 is formed as a space surrounded by the partition wall portion 4 (peripheral wall portion 25), the housing wall 30, and the third cover 13. As shown in FIGS. 1 to 3, the third cover 13 is disposed so as to cover the third opening 23, and has a flat plate portion.

The third cover 13 has a trapezoidal shape in plan view as shown in FIG. 3, and includes a first portion 131 and a second portion 132 shorter than the first portion 131 in terms of dimensions in the axial direction L and the width direction H. The first portion 131 and the second portion 132 are formed continuously. In the present embodiment, the second portion 132 is formed so that the dimension in the axial direction L decreases from the first portion 131 side (in this case, the second widthwise side H2) to the second portion 132 side (in this case, the first widthwise side H1) along the width direction H. In the present embodiment, the dimension of the second portion 132 in the axial direction L decreases such that the side of the second portion 132 on the first axial side L1 is inclined to the second axial side L2 toward the first widthwise side H1. As described above, the third cover 13 has the trapezoidal shape in plan view, and can be regarded as having a rectangular first portion 131 and a triangular second portion 132.

The rotary electric machine MG is a rotary electric machine (motor/generator) that operates by multi-phase alternating current (e.g., three-phase alternating current), and can function as both an electric motor and a generator. As will be described later with reference to FIG. 5, the rotary electric machine MG receives electric power supplied from a high-voltage battery BH (high-voltage direct current power source) to perform power running, or supplies (regenerates) electric power generated by the inertial force of the vehicle to the high-voltage battery BH.

Figure 5:
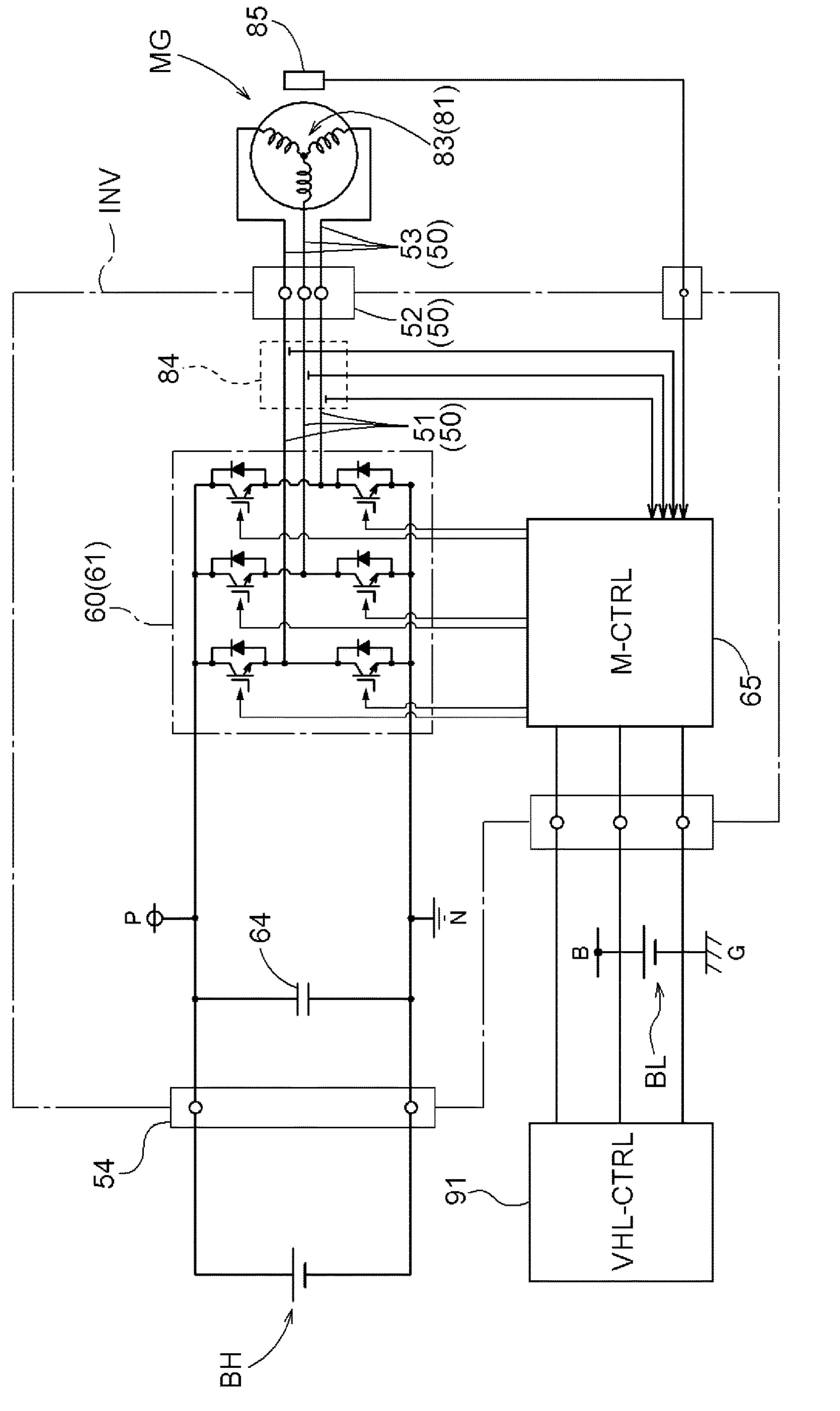
FIG. 5 is a schematic circuit block diagram of an electric system for driving a rotary electric machine.
Figure 6:
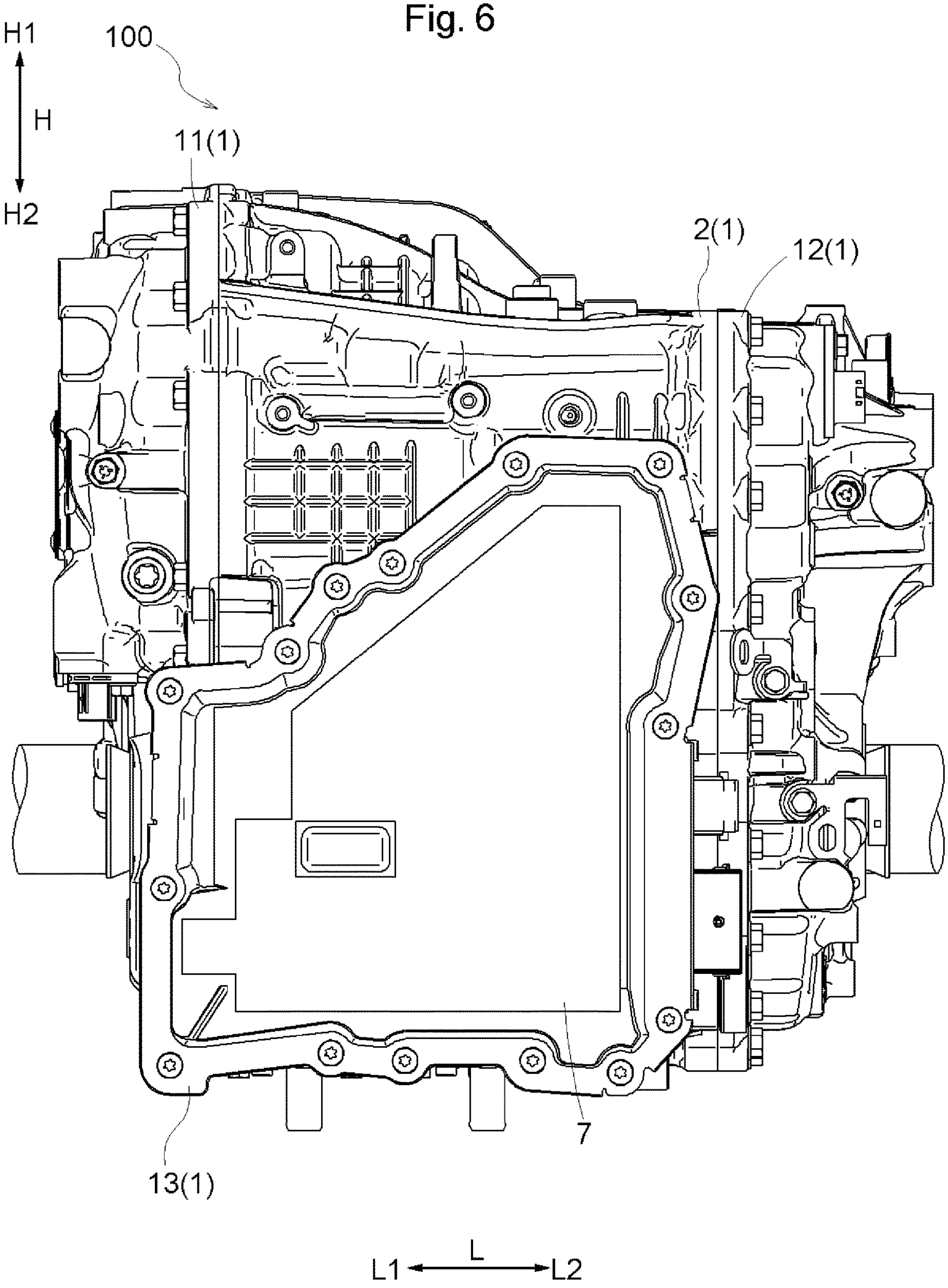
FIG. 6 is a diagram showing an example of a damping member attached to a third cover.
Figure 7:
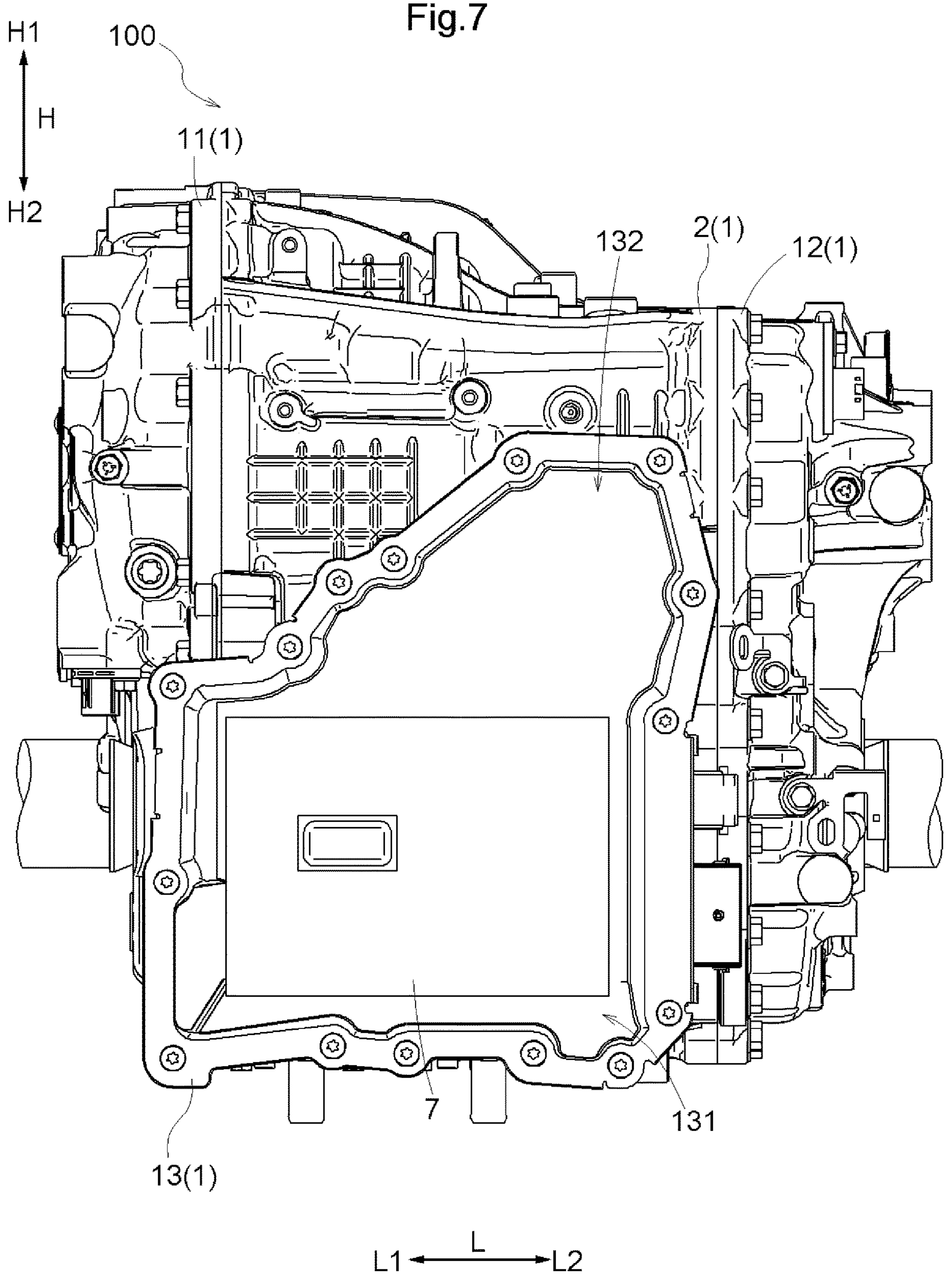
FIG. 7 is a diagram showing another example of the damping member attached to the third cover.

As shown in FIGS. 1 and 5, the rotary electric machine MG includes a stator 81 fixed to the case 1 or the like, and a rotor 82 rotatably supported on a radially inner side of the stator 81. The stator 81 includes a stator core and stator coils 83 wound around the stator core, and the rotor 82 includes a rotor core and permanent magnets disposed in the rotor core. The rotor 82 of the rotary electric machine MG is drivingly connected to an input gear G1 (see FIGS. 1 and 4) via a rotor shaft 82*a* and an input member IN.

The input gear G1 is drivingly connected to the counter gear mechanism CG. In the present embodiment, the counter gear mechanism CG includes two gears connected by a shaft member (first counter gear G2 and second counter gear G3). The first counter gear G2 meshes with the input gear G1, and the second counter gear G3 meshes with a differential input gear G4 of the differential gear mechanism DF. The differential gear mechanism DF is drivingly connected to the wheels W via output shafts OX. The differential gear mechanism DF includes a plurality of bevel gears meshing with each other. In the present embodiment, the first side gear S1 on the first axial side L1 is connected to one output shaft OX via a connecting shaft JT, and the second side gear S2 on the second axial side L2 is connected to the other output shaft OX. Rotation and torque that are input to the differential input gear G4 are distributed and transmitted to the two output shafts OX (that is, the two wheels W) via the first side gear S1 and the second side gear. Thus, the vehicle drive device 100 can transmit the torque of the rotary electric machine MG to the wheels W to cause the vehicle to travel.

The first housing chamber 5 houses first bearings B1 that rotatably support the rotary electric machine MG, and a second bearing B2 that rotatably supports the connecting shaft JT connecting the output shaft OX and the first side gear S1 of the differential gear mechanism DF. The first bearings B1 include a first rotor bearing B1*a* and a second rotor bearing B1*b*. The first rotor bearing B1*a* is supported by the first cover 11. The second rotor bearing B1*b* is supported by a support wall 8 that is formed integrally with the case 1 and extends in a direction orthogonal to the first axis A1. The rotor shaft 82*a* of the rotary electric machine MG is rotatably supported by the first bearings B1 on both the first axial side L1 and the second axial side L2. The second bearing B2 is supported by the first cover 11. The one output shaft OX is supported by the second bearing B2 on the first axial side L1, and is connected to the connecting shaft JT on the second axial side L2. The connecting shaft JT is connected to the first side gear S1 of the differential gear mechanism DF on the second axial side L2. The other output shaft OX is connected to the second side gear S2 of the differential gear mechanism DF on the first axial side L1.

The rotor shaft 82*a* of the rotary electric machine MG is connected to the input member IN and rotates integrally with the input member IN. The input gear G1 is formed on the input member IN. The input member IN is rotatably supported by the support wall 8 via a bearing on the first axial side L1, and is rotatably supported by the second cover 12 via a bearing on the second axial side (reference numerals of the bearings in the drawings are omitted). Similarly, the counter gear mechanism CG is rotatably supported by the support wall 8 via a bearing on the first axial side L1, and is rotatably supported by the second cover 12 via a bearing on the second axial side. Further, the differential gear mechanism DF is rotatably supported by the support wall 8 via a bearing on the first axial side L1, and is rotatably supported by the second cover 12 via a bearing on the second axial side. By providing the support wall 8 in the first housing chamber 5 as described above, the rotary electric machine MG and the transmission mechanism TM are appropriately housed in the first housing chamber 5 while suppressing an increase in the size of the case 1.

As shown in FIG. 5, the drive of the rotary electric machine MG is controlled by the inverter device INV. The inverter device INV includes an inverter circuit 60 that converts electric power between direct current power and multi-phase alternating current power. The present embodiment exemplifies the inverter circuit 60 connected to the alternating-current rotary electric machine MG and the high-voltage battery BH to convert electric power between direct current and multi-phase alternating current (in this case, three phases that are U phase, V phase, and W phase). The inverter circuit 60 includes a plurality of switching elements, and is connected to the high-voltage battery BH and the alternating-current rotary electric machine MG to convert electric power between direct current and multi-phase alternating current (in this case, three-phase alternating current). The high-voltage battery BH is a secondary battery (battery) such as a nickel-metal hydride battery or a lithium-ion battery, or an electric double layer capacitor. When the rotary electric machine MG is the driving force source of the vehicle, the high-voltage battery BH is a direct current power source having a large voltage and a large capacity, and the rated power source voltage is, for example, 200 to 400 [V].

The inverter circuit 60 includes, on its direct current side, a direct-current link capacitor 64 (smoothing capacitor) for smoothing a voltage between a positive electrode power source line P and a negative electrode power source line N on the direct current side of the inverter circuit 60 (direct-current link voltage). The direct-current link capacitor 64 stabilizes the direct current voltage (direct-current link voltage) that fluctuates in response to the fluctuation in power consumption of the rotary electric machine MG.

The inverter circuit 60 includes a plurality of (in this case, three) arms for single-phase alternating currents, each structured by a series circuit of an upper switching element and a lower switching element. It is preferable that a power semiconductor element capable of operating at a high frequency, such as an insulated gate bipolar transistor (IGBT), a power metal oxide semiconductor field effect transistor (MOSFET), a silicon carbide-metal oxide semiconductor FET (SiC-MOSFET), a SiC-static induction transistor (SiC-SIT), and a gallium nitride-MOSFET (GaN-MOSFET) be applied to the switching elements. As shown in FIG. 5, the present embodiment exemplifies a form in which the IGBT is used as each switching element. In the present embodiment, a switching element module is structured such that the inverter circuit 60, including freewheeling diodes as well, is integrated into one power module 61 (see FIG. 3).

As shown in FIG. 5, the inverter circuit 60 is controlled by an inverter control device 65 (M-CTRL). The inverter control device 65 is constructed with a logic circuit such as a microcomputer as a core member. The inverter control device 65 performs, based on a target torque of the rotary electric machine MG, current feedback control using a vector control method, and controls the rotary electric machine MG via the inverter circuit 60. The target torque of the rotary electric machine MG is, for example, provided as a request signal from other control devices such as a vehicle control device 91 (VCL-CTRL) that is one of the higher-order control devices in the vehicle. An actual current flowing through the stator coil 83 of each phase of the rotary electric machine MG is detected by a current sensor 84. The magnetic pole position of the rotor of the rotary electric machine MG at each time point is detected by a rotation sensor 85 such as a resolver. The present embodiment exemplifies a form in which the current sensor 84 detects alternating currents in inverter-side alternating-current busbars 51 inside the inverter device INV. The current sensor 84 may detect alternating currents flowing through, for example, rotary electric machine-side alternating-current busbars 53 outside the inverter device INV.

The inverter control device 65 performs the current feedback control using the detection results from the current sensor 84 and the rotation sensor 85. The inverter control device 65 includes various functional units for the current feedback control, and each of the functional units is implemented by cooperation between hardware such as a microcomputer and software (program). Since the current feedback control is known, detailed description thereof will be omitted herein.

In the vehicle control device 91 and the inverter control device 65, the operating voltage of the core microcomputer or the like is, for example, 5 [V] or 3.3 [V]. Therefore, the vehicle control device 91 and the inverter control device 65 are low-voltage circuits that operate on electric power supplied from a low-voltage battery BL (low-voltage direct current power source) with a lower voltage (e.g., 12 to 24 [V]) than that of the high-voltage battery BH. Therefore, the inverter control device 65 includes a drive circuit that increases the driving capacity (e.g., capacity to operate a subsequent circuit, such as a voltage amplitude and an output current) of a switching control signal for each switching element (gate drive signal in the case of an IGBT) and relays the switching control signal. A control terminal of each switching element constituting the inverter circuit 60 is connected to the core microcomputer or the like of the inverter control device 65 via the drive circuit, and switching control is performed for each switching element. The inverter control device 65 is structured by mounting circuit components on one or more substrates.

The inverter device INV is structured as a unit including the inverter control device 65, the direct-current link capacitor 64, and the inverter circuit 60 (power module 61) described above. For example, the inverter device INV includes at least the power module 61 in which the inverter circuit 60 is structured by the plurality of switching elements, the direct-current link capacitor 64 (smoothing capacitor) for smoothing a voltage on the direct current side of the inverter circuit 60, and the current sensor 84 for detecting alternating currents flowing through the rotary electric machine MG. As described later, the inverter device INV as a unit is disposed in the second housing chamber 3 inside the case 1 and fixed to the case 1 with fastening members such as bolts.

In the present embodiment, many components of the inverter device INV are disposed to adjoin each other in directions orthogonal to the up-down direction V (axial direction L and width direction H). In the present embodiment, as shown in FIG. 3, at least the power module 61, the direct-current link capacitor 64, and the current sensor 84 are disposed to adjoin each other in a direction orthogonal to the up-down direction V. That is, the direct-current link capacitor 64, the power module 61, and the current sensor 84 are disposed substantially on the same plane along the axial direction L from the second axial side L2 to the first axial side L1. FIG. 3 further exemplifies a form in which alternating-current busbar connectors 52 are disposed on the first axial side L1 of the current sensor 84 and direct-current busbar connectors 54 are disposed on the first widthwise side H1 of the alternating-current busbar connectors 52.

In the present embodiment, the components of the inverter device INV are disposed over the plane in this manner (so-called flat disposition). That is, the inverter device INV is structured so that the dimension in the up-down direction V decreases. As shown in FIGS. 1 to 3, the inverter device INV is disposed on the first up-down side V1 of the counter gear mechanism CG and the differential gear mechanism DF. That is, the inverter device INV is disposed so as to overlap the counter gear mechanism CG and the differential gear mechanism DF when viewed in the up-down direction. As shown in FIGS. 1 and 2, the inverter device INV is disposed such that its disposition area in the up-down direction V overlaps the disposition area of the rotary electric machine MG. As described above, the inverter device INV includes at least the power module 61, the direct-current link capacitor 64, and the current sensor 84. The power module 61, the direct-current link capacitor 64, and the current sensor 84 are disposed such that their disposition areas in the up-down direction V overlap the disposition area of the rotary electric machine MG in the up-down direction V.

As shown in FIG. 5, the inverter device INV and the stator coils 83 of the rotary electric machine MG are electrically connected by alternating-current busbars 50. The alternating-current busbars 50 include the inverter-side alternating-current busbars 51, the alternating-current busbar connectors 52, and the rotary electric machine-side alternating-current busbars 53. The alternating-current busbar connectors 52 (alternating-current busbar connection members) are disposed between the first housing chamber 5 and the second housing chamber 3 through the partition wall portion 4. One end of the alternating-current busbar connector 52 and the inverter-side alternating-current busbar 51 are electrically connected inside the second housing chamber 3. The other end of the alternating-current busbar connector 52 and the rotary electric machine-side alternating-current busbar 53 are electrically connected inside the first housing chamber 5.

As described above, the case body 2 is integrally formed so as to form the first housing chamber 5 that houses the rotary electric machine MG and the like and the second housing chamber 3 that houses the inverter device INV. For example, in a case of a vehicle drive device with a direct mount structure in which another case member housing the inverter device INV is mounted outside a case member in which the first housing chamber 5 is formed, the bottom wall of the case member housing the inverter device INV vibrates and noise is likely to occur due to spatial resonance. In a case where the second housing chamber 3 and the first housing chamber 5 are integrally formed as one case 1 (case body 2) as in the present embodiment, the second housing chamber 3 need not have a bottom wall. Accordingly, noise is less likely to occur due to the spatial resonance caused by the vibration of the bottom wall.

When the case body 2 is integrally formed so as to form the first housing chamber 5 and the second housing chamber 3, the case 1 can have high rigidity as compared to the case where the case 1 is formed by combining the first housing chamber 5 and the second housing chamber 3 that are formed as separate chambers. Since the common partition wall portion 4 separating the first housing chamber 5 and the second housing chamber 3 can be used, the weight of the case 1 can be reduced as compared to the case where the two housing chambers are formed as separate chambers.

Since the case 1 includes the case body 2 integrally formed so as to form the first housing chamber 5 and the second housing chamber 3 as described above, it is possible to structure the vehicle drive device 100 that is excellent in ease of mounting on a vehicle because of the reduction in the size and weight and achieves improvement in cost reduction and spatial resonance. However, vibration caused along with the operations of the devices housed in the first housing chamber 5 (rotary electric machine MG and transmission mechanism TM) may propagate to the third cover 13 via the peripheral wall portion 25 and the housing wall 30 of the case body 2 to vibrate the third cover 13. In the present embodiment, the third cover 13 has the flat plate portion as shown in FIGS. 1 to 3. The propagated vibration may vibrate the flat plate portion to cause drum-like membrane vibration. Particularly when the components of the inverter device INV are disposed over the plane as in the present embodiment, the area of the flat plate portion of the third cover 13 tends to increase. Therefore, there is a tendency that the membrane vibration easily occurs. For example, even if grid-like ribs protruding in the up-down direction V are formed on the third cover 13, only the peak frequency of the membrane vibration changes and the reduction of vibration is limited. When the material of the third cover 13 is changed, for example, from iron to aluminum, the effect of suppressing the membrane vibration can be obtained by increasing the thickness while suppressing an increase in weight. However, there are problems such as a decrease in the ease of mounting and an increase in the cost due to the increase in the thickness.

In the present embodiment, a sheet-shaped damping member 7 having a function of converting vibration into heat is attached so as to cover at least a part of the flat plate portion of the third cover 13. By attaching the damping member 7, the membrane vibration can be reduced while maintaining the shape of the case 1. The need for material change and shape change described above can also be reduced.

Although the third cover 13 may have protrusions such as ribs, the membrane vibration is likely to occur in a plate-shaped portion. Therefore, it is preferable that the damping member 7 be attached to a portion having no projections and recesses on the surface of the third cover 13. If the third cover 13 has projections and recesses, it is preferable that the damping member 7 be attached at a portion other than the projections and recesses as shown in FIG. 3. The damping member 7 need not be attached to the entire flat plate portion, and may cover a part of the flat plate portion.

As described above, the third cover 13 includes the first portion 131 and the second portion 132 shorter than the first portion 131 in terms of the dimensions in the axial direction L and the width direction H (in the present embodiment, the dimension in the axial direction L). In the case where the damping member 7 covers a part of the flat plate portion of the third cover 13 instead of the entire flat plate portion, it is preferable that the damping member 7 be attached to, for example, the first portion 131.

A sheet of the damping member 7 produced as an industrial product is often rectangular. If the shape of the damping member 7 to be attached is an irregular shape such as a trapezoidal shape when cutting the damping member 7 from the sheet, the number of cuts from the sheet may decrease and the cost of the damping member 7 per sheet may increase. Since the first portion 131 is substantially rectangular, it is possible to obtain a damping effect while reducing the cost by attaching the damping member 7 to the first portion 131. As in the present embodiment, the area of the first portion 131 is often larger than that of the second portion 132 having a portion with a small dimension. Therefore, it is easy to obtain the damping effect by attaching the damping member 7 to the first portion 131.

In the present embodiment, the damping member 7 is attached so as to cover the outer surface of the flat plate portion of the third cover 13. The damping member 7 may also be attached to the inner surface of the flat plate portion (that is, inside the second housing chamber 3). When the damping member 7 peels off due to, for example, a change over time, however, the damping member 7 may interfere with the circuit of the inverter device INV and affect the circuit. Therefore, it is preferable that the damping member 7 be attached to the outer surface of the third cover 13.

Figure 8:
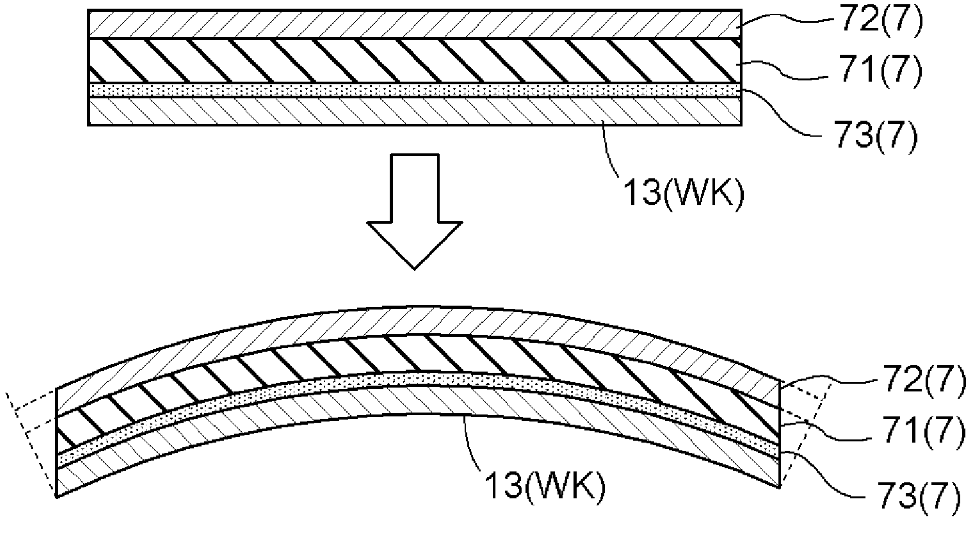
FIG. 8 is a diagram showing a structural example of the damping member and the damping principle of the damping member.

As shown in FIG. 8, the damping member 7 includes a vibration transmission layer 71 including at least a layer made of a viscoelastic resin, and a hard layer 72 made of a material having higher rigidity than the vibration transmission layer 71. The vibration transmission layer 71 is disposed closer to the cover member (third cover 13) than the hard layer 72 is. For example, the vibration transmission layer 71 is made of butyl rubber, and the hard layer 72 is made of aluminum. In the present embodiment, the damping member 7 further includes an adhesive layer 73. The adhesive layer 73 is disposed closer to the third cover 13 than the vibration transmission layer 71 is. The damping member 7 is attached to the third cover 13 by the adhesive layer 73. The adhesive layer 73 is made of, for example, an acrylic pressure-sensitive adhesive material.

When the damping member 7 is attached to a target member WK that causes membrane vibration, the damping member 7 is deformed in conformity with deformation of the target member WK. As described above, the damping member 7 includes at least two layers made of different materials (vibration transmission layer 71 and hard layer 72). The deformation conforming to the deformation of the target member WK differs between the two layers. For example, the vibration transmission layer 71 is deformed by vibration transmitted from the target member WK, but the hard layer 72 that is less deformable than the vibration transmission layer 71 is disposed on the surface opposite to the target member WK. Therefore, the deformation of the vibration transmission layer 71 is suppressed, and the vibration transmitted from the target member WK is reduced. Energy of the membrane vibration of the target member WK is converted into heat energy and consumed in the hard layer 72. That is, the vibration energy is absorbed by displacement (shear strain) between the layers caused by the deformation of the damping member 7. Since the vibration transmission layer 71 is disposed closer to the target member WK (third cover 13) than the hard layer 72 is in this manner, the membrane vibration of the target member WK is suppressed effectively.

Figure 9:
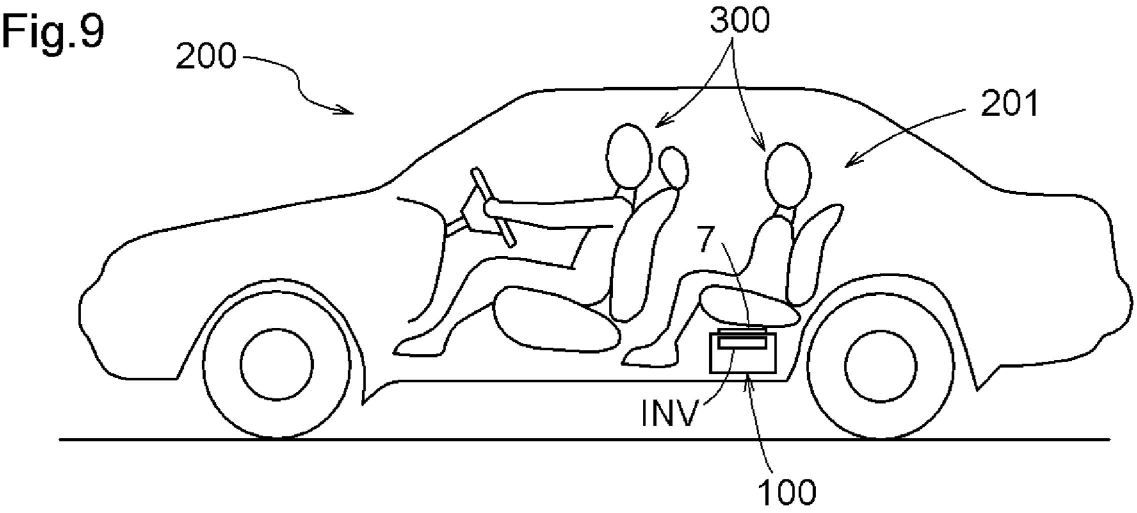
FIG. 9 is a diagram showing an example of mounting of the vehicle drive device on a vehicle.

In the present embodiment, in a state in which the vehicle drive device 100 is mounted on a vehicle 200 as shown in FIG. 9, the third cover 13 is disposed so as to cover the inverter device INV on a vehicle cabin 201 side where occupants 300 of the vehicle 200 are present. That is, in the state in which the vehicle drive device 100 is mounted on the vehicle, the third cover 13 is disposed between the inverter device INV and the vehicle cabin 201 side where the occupants 300 of the vehicle 200 are present. When the third cover 13 disposed on the vehicle cabin 201 side causes membrane vibration, audible noise is likely to reach the occupants 300, but the damping member 7 reduces the audible noise.

As a matter of course, the audible noise generated in the vehicle drive device 100 may propagate to the vehicle cabin 201 via structural members of the vehicle 200. Therefore, even if the third cover 13 is not disposed so as to cover the inverter device INV on the vehicle cabin 201 side, the damping member 7 suppresses the membrane vibration of the third cover 13. Thus, it is possible to reduce the audible noise transmitted to the occupants 300.

In the present embodiment, as described above, the case body 2 includes the partition wall portion 4 that separates the first housing chamber 5 and the second housing chamber 3 from each other. The partition wall portion 4 can reduce vibration transmitted from the rotary electric machine MG or the transmission mechanism TM to the third cover 13.

OTHER EMBODIMENTS

Hereinafter, other embodiments will be described. The configuration of each embodiment described below is not limited to being applied alone, and can be applied in combination with the configurations of other embodiments as long as there is no contradiction.

Figure 10:
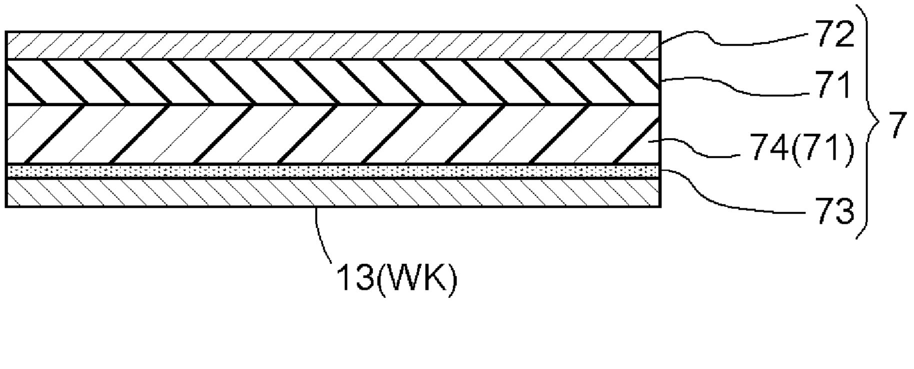
FIG. 10 is a diagram showing another structural example of the dam ping member.

(1) The above description exemplifies the damping member 7 in which the vibration transmission layer 71 is made of butyl rubber and the hard layer 72 is made of aluminum. That is, the description exemplifies the form in which the vibration transmission layer 71 is made of the viscoelastic resin. As shown in FIG. 10, the vibration transmission layer 71 may include a dynamic space layer 74 in addition to the layer made of the viscoelastic resin (viscoelastic resin layer). It is preferable that the dynamic space layer 74 include synthetic resin cells having a large number of small chambers with a synthetic resin such as polypropylene.

(2) The above description exemplifies the form in which the third opening 23 is open to the first up-down side V1. The third opening 23 may be open in any direction along the up-down direction V or the width direction H (that is, any direction of the radial direction R). The third opening 23 may also be open in any direction along the axial direction L.

(3) The above description exemplifies the form in which the first housing chamber 5 and the second housing chamber 3 are separated from each other by the partition wall portion 4. The case body 2 need not include the partition wall portion 4 as long as the case body 2 is integrally formed so as to form the first housing chamber 5 and the second housing chamber 3.

(4) The case 1 described with reference to FIGS. 1 to 3 is an example, and the shape of the case 1 is not limited to the above shape. It is sufficient that the case 1 includes the cover member including the flat plate portion and the damping member 7 is attached to the flat plate portion of the cover member.

(5) The above description exemplifies the vehicle drive device 100 including the rotary electric machine MG as the driving force source for the wheels W. The vehicle drive device 100 may be a hybrid drive device including both an engine and the rotary electric machine MG as the driving force source for the wheels W of the vehicle (various types of hybrid drive device such as a so-called one-motor parallel type and a so-called two-motor split type).

(6) The above description exemplifies the three-axis vehicle drive device 100 in which the three axes that are the first axis A1, the second axis A2, and the third axis A3 are parallel to each other. The vehicle drive device 100 may be a two-axis vehicle drive device in which two axes that are the first axis A1 and the second axis A2 are parallel to each other. The vehicle drive device 100 may further have one or more axes different from the first axis A1, the second axis A2, and the third axis A3, that is, may have four or more axes. In these cases, a part of the axes may extend along a direction(s) that is not parallel to those of the remainder of the axes.

Summary of Embodiment

Hereinafter, a brief summary of the vehicle drive device (100) described above will be provided.

As one aspect, a vehicle drive device (100) includes a rotary electric machine (MG), an inverter device (INV) configured to control drive of the rotary electric machine (MG), and a case (1). The case (1) includes a case body (2) and a cover member (13) joined to the case body (2). The case body (2) is integrally formed so as to form a first housing chamber (5) that houses the rotary electric machine (MG) and a second housing chamber (3) that houses the inverter device (INV), and has an opening (23) that is open from the second housing chamber (3) toward an outside of the case (1). The cover member (13) is disposed so as to cover the opening (23), and includes a flat plate portion. A sheet-shaped damping member (7) having a function of converting vibration into heat is attached so as to cover at least a part of the flat plate portion.

The rotary electric machine (MG) and the inverter device (INV) for driving the rotary electric machine (MG) may be housed in the case (1) including the integrally formed case body (2) to facilitate mounting of the vehicle drive device (100) on the vehicle (200). When the inverter device (INV) and the rotary electric machine (MG) are housed in the case (1) integrally formed in this manner, the vibration of the rotary electric machine (MG) is likely to be transmitted to the second housing chamber (3) that houses the inverter device (INV). The second housing chamber (3) has the opening (23) through which, for example, the inverter device (INV) is attached to the case (1). The opening (23) is often covered with the cover member (13). When the cover member (13) is thinned to reduce the size of the vehicle drive device (100), the cover member (13) often has the flat plate portion. With the flat plate portion, when the vibration of the rotary electric machine (MG) is transmitted to the cover member (13), the flat plate portion particularly vibrates and is likely to cause noise or the like. According to this configuration, the damping member (7) is attached so as to cover at least a part of the flat plate portion. Therefore, the vibration transmitted from the cover member (7) can be converted into heat by the damping member (7), and the vibration of the cover member (13) can be reduced. That is, according to this configuration, it is possible to reduce the vibration of the cover member (13) that closes the housing space where the inverter device (INV) is housed in the vehicle drive device (100) including the rotary electric machine (MG), the inverter device (INV), and the integrally formed case (1) that houses them.

In the vehicle drive device (100), it is preferable that, assuming that a direction along a rotation axis of the rotary electric machine (MG) is an axial direction (L) and a direction orthogonal to an up-down direction (V) and the axial direction (L) is a width direction (H), the cover member (13) include a first portion (131) and a second portion (132) shorter than the first portion (131) in terms of a dimension in the axial direction (L) or the width direction (H), and the damping member (7) be attached to the first portion (131).

The shape of the cover member (13) including the first portion (131) and the second portion (132) is not rectangular in plan view. A sheet of the damping member (7) produced as an industrial product is often rectangular. If the shape of the damping member (7) to be attached is an irregular shape when cutting the damping member (7) from the sheet, the number of cuts from the sheet may decrease and the cost of the damping member (7) per sheet may increase. Since the first portion (131) is regarded as being substantially rectangular, it is possible to obtain a damping effect while reducing the cost by attaching the damping member (7) to the first portion (131). The area of the first portion (131) is often larger than that of the second portion (132) having a portion with a small dimension. Therefore, it is easy to obtain the damping effect by attaching the damping member (7) to the first portion (131).

It is preferable that, in a state in which the vehicle drive device (100) is mounted on a vehicle (200), the cover member (13) be disposed between the inverter device (INV) and a vehicle cabin (201) side where an occupant (300) of the vehicle (200) is present.

When the cover member (13) disposed on the vehicle cabin (201) side causes membrane vibration, audible noise is likely to reach the occupant (300). According to this configuration, the audible noise is appropriately reduced by the damping member (7) disposed between the inverter device (INV) and the vehicle cabin (201).

In the vehicle drive device (100), it is preferable that the inverter device (INV) include at least a power module (61) in which an inverter circuit (60) is structured by a plurality of switching elements, a smoothing capacitor (64) configured to smooth a voltage on a direct current side of the inverter circuit (60), and a current sensor (84) configured to detect an alternating current flowing through the rotary electric machine (MG), and the power module (61), the smoothing capacitor (64), and the current sensor (84) be disposed to adjoin each other in a direction orthogonal to the up-down direction (V).

When the components of the inverter device (INV) are disposed over the plane in this manner, the area of the flat plate portion of the cover member (13) tends to increase. Therefore, there is a tendency that the membrane vibration easily occurs. Thus, in the vehicle drive device (100) having such a configuration, it is effective to suppress the membrane vibration by the damping member (7).

In the vehicle drive device (100), it is preferable that disposition areas of the power module (61), the smoothing capacitor (64), and the current sensor (84) in the up-down direction (V) overlap a disposition area of the rotary electric machine (MG) in the up-down direction.

According to this configuration, it is easy to reduce the dimension of the vehicle drive device (100) in the up-down direction (V) because the inverter device (INV) is not disposed so as to overlap the rotary electric machine (MG) when viewed in the up-down direction. The components of the inverter device (INV) are disposed such that the disposition area of the rotary electric machine (MG) in the up-down direction (V) overlaps the disposition areas of the inverter device (INV) in the up-down direction. Therefore, in this configuration, the components of the inverter device (INV) are disposed over the plane. In this case, the membrane vibration of the cover member (13) is likely to occur as described above. Therefore, it is effective to suppress the membrane vibration by the damping member (7). That is, it is possible to reduce the vibration of the cover member (13) that closes the housing space where the inverter device (INV) is housed in the case where the rotary electric machine (MG), the inverter device (INV), and the integrally formed case (1) that houses them are provided to reduce the size of the vehicle drive device (100).

In the vehicle drive device (100), it is preferable that the damping member (7) include a vibration transmission layer (71) including at least a layer made of a viscoelastic resin, and a hard layer (72) made of a material having higher rigidity than the vibration transmission layer (71), and the vibration transmission layer (71) be disposed closer to the cover member (13) than the hard layer (72) is.

When the damping member (7) is attached to a target member (WK) that causes membrane vibration, the damping member (7) is deformed in conformity with deformation of the target member (WK). In this configuration, the damping member (7) includes at least two layers made of different materials (vibration transmission layer (71) and hard layer (72)). The deformation conforming to the deformation of the target member (WK) differs between the two layers. For example, the vibration transmission layer (71) is deformed by vibration transmitted from the target member (WK), but the hard layer (72) that is less deformable than the vibration transmission layer (71) is disposed on the surface opposite to the target member (WK). Therefore, the deformation of the vibration transmission layer (71) is suppressed, and the vibration transmitted from the target member (WK) is reduced. Energy of the membrane vibration of the target member (WK) is converted into heat energy and consumed in the hard layer (72). That is, the vibration energy is absorbed by displacement (shear strain) between the layers caused by the deformation of the damping member (7). Since the vibration transmission layer (71) is disposed closer to the cover member (13) that is the target member (WK) than the hard layer (72) is as in this configuration, the membrane vibration of the cover member (13) is suppressed effectively.

In the vehicle drive device (100), it is preferable that the case body (2) include a partition wall portion (4) that separates the first housing chamber (5) and the second housing chamber (3) from each other.

According to this configuration, the partition wall portion (4) can reduce vibration transmitted from the rotary electric machine (MG) to the cover member (13).

DESCRIPTION OF THE REFERENCE NUMERALS

1: case, 2: case body, 3: second housing chamber, 4: partition wall portion, first housing chamber, 7: damping member, 13: third cover (cover member), 23: third opening (opening), 60: inverter circuit, 61: power module, 64: direct-current link capacitor (smoothing capacitor), 71: vibration transmission layer, 72: hard layer, 84: current sensor, 100: vehicle drive device, 131: first portion, 132: second portion, 200: vehicle, 201: vehicle cabin, 300: occupant, H: width direction, INV: inverter device, L: axial direction, MG: rotary electric machine, V: up-down direction

The invention claimed is:

1. A vehicle drive device comprising:

a rotary electric machine disposed on a first axis with a direction parallel to the first axis being an axial direction;

an inverter device configured to control drive of the rotary electric machine; and a case, wherein the case includes a case body and a cover member joined to the case body, the case body is integrally formed so as to form a first housing chamber that houses the rotary electric machine and a second housing chamber that houses the inverter device, and has an opening that is open from the second housing chamber toward an outside of the case, the cover member is disposed so as to cover the opening, and includes a flat plate portion, a sheet-shaped damping member having a function of converting vibration into heat is attached so as to cover at least a part of the flat plate portion, the inverter device includes at least a power module in which an inverter circuit is structured by a plurality of switching elements, a smoothing capacitor configured to smooth a voltage on a direct current side of the inverter circuit, and a current sensor configured to detect an alternating current flowing through the rotary electric machine, the power module, the smoothing capacitor, and the current sensor are disposed to adjoin each other in a direction orthogonal to a vertical direction, a widthwise direction is a direction perpendicular to the axial direction and the vertical direction is a direction perpendicular to both the axial direction and the widthwise direction;

disposition areas of the power module, the smoothing capacitor, and the current sensor in the vertical direction overlap a disposition area of the rotary electric machine in the vertical direction such that a bottom of the disposition areas of the power module, the smoothing capacitor, and the current sensor in the vertical direction is below in the vertical direction a topmost end of the disposition area of the rotary electric machine in the vertical direction; and the disposition area of the smoothing capacitor overlaps the disposition area of the rotary electric machine when viewed in the axial direction.

2. The vehicle drive device according to claim 1, wherein the cover member includes a first portion and a second portion shorter than the first portion in terms of a dimension in the axial direction or the widthwise direction, and the damping member is attached to the first portion.

3. The vehicle drive device according to claim 1, wherein in a state in which the vehicle drive device is mounted on a vehicle, the cover member is disposed between the inverter device and a vehicle cabin side.

4. The vehicle drive device according to claim 1, wherein the damping member includes a vibration transmission layer including at least a layer made of a viscoelastic resin, and a hard layer made of a material having higher rigidity than the vibration transmission layer, and the vibration transmission layer is disposed closer to the cover member than the hard layer is.

5. The vehicle drive device according to claim 1, wherein the case body includes a partition wall portion that separates the first housing chamber and the second housing chamber from each other.

6. The vehicle drive device according to claim 1, wherein the disposition area of the smoothing capacitor in the vertical direction overlaps the disposition area of the rotary electric machine in the vertical direction when viewed in the axial direction.

7. The vehicle drive device according to claim 1, wherein the bottom of the disposition area of the smoothing capacitor in the vertical direction is below in the vertical direction the topmost end of the disposition area of the rotary electric machine in the vertical direction.

* * * * *